US012798031B2

(12) United States Patent
Breitzke

(10) Patent No.: US 12,798,031 B2
(45) Date of Patent: Nov. 17, 2026

(54) MEASURING BODY FOR VERIFYING GEOMETRICAL DEVIATIONS OF A 3-AXIS MACHINE TOOL, 3-AXIS MACHINE TOOL, AND METHOD FOR COMPENSATING GEOMETRICAL DEVIATIONS OF A 3-AXIS MACHINE TOOL

(71) Applicant: Röders GmbH, Soltau (DE)

(72) Inventor: André Breitzke, Schneverdingen (DE)

(73) Assignee: Röders GmbH, Soltau (DE)

( * ) Notice: Subject to any disclaimer, the term of this patent is extended or adjusted under 35 U.S.C. 154(b) by 197 days.

(21) Appl. No.: 18/941,545

(22) Filed: Nov. 8, 2024

(65) Prior Publication Data

US 2025/0065464 A1 Feb. 27, 2025

Related U.S. Application Data

(63) Continuation of application No. PCT/EP2023/061456, filed on May 2, 2023.

(30) Foreign Application Priority Data

May 16, 2022 (DE) ......................... 102022112154.2

(51) Int. Cl.
*B23Q 17/22* (2006.01)
*G01B 21/00* (2006.01)

(52) U.S. Cl.
CPC ............. *B23Q 17/22* (2013.01); *G01B 21/00* (2013.01)

(58) Field of Classification Search
CPC ...... G05B 19/401; B23Q 1/626; B23Q 17/22; G01B 21/00; G01B 21/042; G01B 5/008; G01B 3/30
USPC ................................................ 73/865.8, 1.79
See application file for complete search history.

(56) References Cited

U.S. PATENT DOCUMENTS 4,364,182 A 12/1982 Jones
2002/0157449 A1* 10/2002 Asanuma ............. G01B 21/042 73/1.79
2011/0162434 A1* 7/2011 Rastogi .................... G01B 3/30 29/407.01

(Continued)

FOREIGN PATENT DOCUMENTS

CN 101750002 A 6/2010
CN 109341471 A 2/2019

(Continued)

*Primary Examiner* — John E Breene
*Assistant Examiner* — Truong D Phan
(74) *Attorney, Agent, or Firm* — Dinsmore & Shohl LLP; Yongsok Choi, Esq.

(57) ABSTRACT

The invention relates to a measurement body for checking geometric deviations in a 3-axis machine tool comprising a base plate, a first wall which protrudes perpendicularly from the base plate, a second wall which protrudes perpendicularly from the base plate and is arranged perpendicularly to the first wall. A first row of holes and a second row of holes are formed in the base plate. The first wall is a stepped triangle and comprises a step-shaped region having a plurality of steps, on an upper, exposed region. The second wall is a square wall and comprises a first row of wall holes on an upper, exposed region which extends in parallel with the base plate. The first row of holes is arranged in parallel with the row of step holes and the second row of holes is arranged in parallel with the first row of wall holes.

12 Claims, 5 Drawing Sheets

(56) References Cited

U.S. PATENT DOCUMENTS

Figure 1:
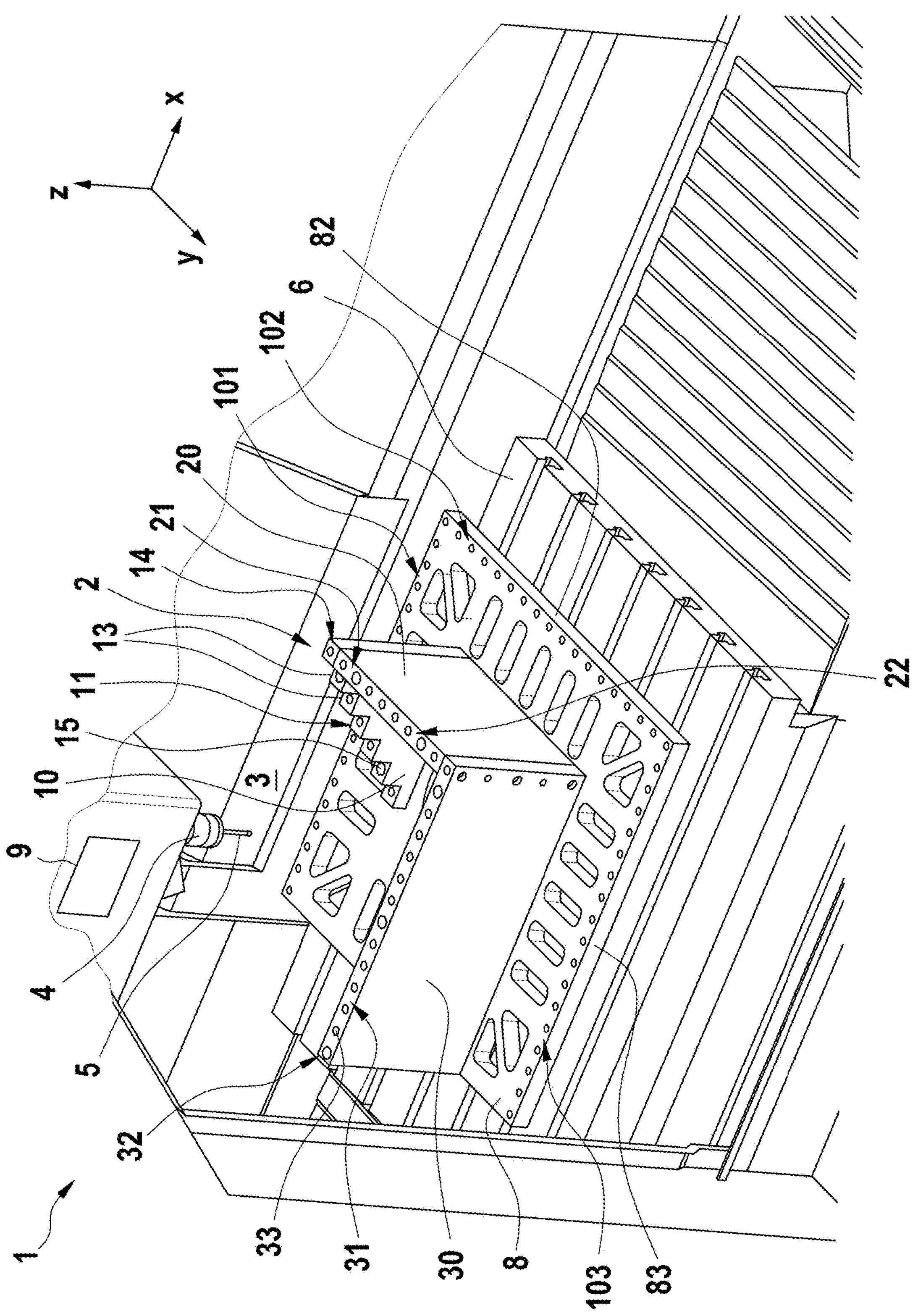

| | | | |
|---|---|---|---|
| 2018/0003491 | A1 | 1/2018 | Sabelli et al. |

FOREIGN PATENT DOCUMENTS

| | | | |
|---|---|---|---|
| CN | 110270883 | A | 9/2019 |
| DE | 29618726 | U1 | 2/1997 |
| DE | 29822001 | U1 | 3/1999 |
| DE | 102006028452 | A1 | 12/2007 |
| DE | 102011001746 | A1 | 10/2012 |
| DE | 102020130193 | B3 | 12/2021 |
| EP | 1491287 | A1 | 12/2004 |
| JP | S6046579 | A | 3/1985 |
| JP | H0569280 | A | 3/1993 |
| JP | 2005081444 | A | 3/2005 |
| JP | 2012500397 | A | 1/2012 |

* cited by examiner

MEASURING BODY FOR VERIFYING GEOMETRICAL DEVIATIONS OF A 3-AXIS MACHINE TOOL, 3-AXIS MACHINE TOOL, AND METHOD FOR COMPENSATING GEOMETRICAL DEVIATIONS OF A 3-AXIS MACHINE TOOL

CROSS-REFERENCE TO RELATED APPLICATIONS

This application is a continuation of International Application No. PCT/EP2023/061456 filed on May 2, 2023, which claims priority to German Patent Application No. DE102022112154.2 filed on May 16, 2022, the entire contents of which are herein incorporated by reference.

DESCRIPTION

The present invention relates to a measurement body for checking geometric deviations of a 3-axis machine tool, as well as a 3-axis machine tool having improved geometric accuracy, and a method for checking and compensating geometric deviations of a 3-axis machine tool.

A known problem area in the case of machine tools is the geometric accuracy of the machine tool. The geometric accuracy of a machine tool is determined by the relative deviation of the actual position and orientation of the tool relative to the workpiece, from the target position and orientation. This error is therefore a cause of deviations from the ideal workpiece geometry, and thus of the operating accuracy of a machine tool. In order to improve the geometric accuracy, in general individual axis deviations and the position and orientation of the individual axes relative to one another are considered.

Assuming a rigid-body model, in this case a 3-axis machine tool has three linear deviations in each case (one in the axis direction and two perpendicularly to the axis direction), and three rotational deviations (sheering, pitching and rolling). Thus, six deviations result for each linear axis, such that 18 deviations result for the three linear axes. In addition, three perpendicularity deviations of the linear axes, relative to one another, must also be considered. Thus, a 3-axis machine tool has a total of twenty-one possible geometry errors. In this case, the individual deviations can be superimposed on one another and then actually lead to a significant overall error, which influences the geometric accuracy of the machine tool in an undesired manner.

The object of the present invention is that of providing a measurement body for checking geometric deviations of a 3-axis machine tool, a 3-axis machine tool, and a method for checking and compensating geometric deviations of a 3-axis machine tool, wherein the measurement body and the 3-axis machine tool are constructed as simply and cost-effectively as possible, and the method can be implemented as cost-effectively and quickly as possible.

This object is achieved by a measurement body having the features of claim 1, a 3-axis machine tool having the features of claim 10, and a method having the features of claim 12. The dependent claims in each case show preferred developments of the invention.

In contrast, the measurement body according to the invention for checking geometric deviations of a 3-axis machine tool, having the features of claim 1, has the advantage that, with the aid of the measurement body, geometric deviations of the 3-axis machine tool can be compensated, such that the 3-axis machine tool does not have any linear deviations, any rotational deviations, or any perpendicularity deviations.

Thus, workpieces can subsequently be machined to the highest possible degree of accuracy by the 3-axis machine tool. In this case, the correction data determined on the basis of the measurement body can be used directly for error compensation of the 3-axis machine tool. The measurement body is suitable in particular for machine tools for ultra-precision machining. Furthermore, the measurement body is in particular also suitable for checking, correcting and long-term assessment of machine tools, which can thus be used for ultra-precision machining for their entire use period.

This is achieved according to the invention in that the measurement body comprises a base plate, a first wall and a second wall. The first wall is arranged on the in particular square base plate and protrudes perpendicularly from the base plate. The first wall is a stepped triangle and comprises a step-shaped region having a plurality of steps, on an upper, exposed region. The second wall is furthermore square and also arranged in a perpendicularly protruding manner on the base plate and arranged perpendicularly to the first wall. Furthermore, a first row of holes and a second row of holes is formed in the base plate. Thus, the first wall is configured to be step-shaped, having a plurality of steps on the side facing away from the base plate. The second wall is a square wall, in particular rectangular wall, and comprises an upper, exposed region in parallel with the base plate, in which a first row of wall holes is formed.

The step-shaped region of the first wall thus lies on the upper, exposed region of the first wall. Thus, the upper, exposed region of the first wall forms a step, at which different positions in the Z-direction can be detected, wherein the base plate spans a base plane in the X- and Y-direction. Due to the upper, exposed step-shaped region of the first wall, the first wall substantially has a triangular shape.

Particularly preferably, the step-shaped first wall comprises a row of step holes, wherein a hole is formed in each step. This makes it possible, in addition to determining a position in the Z-direction, to also detect positions in the X- and Y-direction at different heights.

Further preferably, the measurement body further comprises a third wall which is arranged on the base plate and is positioned perpendicularly to the second wall. The third wall is, like the second wall, a square wall having an upper, exposed region which extends in parallel with the base plate and comprises a second row of wall holes. Thus, the third wall is arranged on the base plate in parallel with the first wall. Furthermore, the first row of wall holes and the second row of wall holes are thus arranged perpendicularly to one another. In this case, the first, second and third wall form a U-shaped arrangement.

Further preferably, the measurement body comprises a third row of holes on the base plate, which is in parallel with the second row of wall holes of the third wall.

Preferably, the first, second and third row of holes extend on the upper side of the base plate, in each case along an edge of the base plate, which is particularly preferably configured to be square. Thus, preferably the first row of holes is in parallel with a first edge of the base plate, the second row of holes in parallel with a second edge of the base plate, and the third row of holes in parallel with a third edge of the base plate.

Particularly preferably, the first row of holes is in parallel with the first wall, and/or the second row of holes is in parallel with the second wall, and/or the third row of holes is in parallel with the third wall. This makes it possible that in particular sheer errors and pitch errors and roll errors can be detected by the measurement body.

The first, second and third row of holes particularly preferably have a same number of holes, a same hole spacing, and a same hole diameter.

According to a further preferred embodiment of the invention, the first, second and third wall are each at a predetermined spacing from the first, second and third edge.

Further preferably, the step surfaces of the steps of the stepped triangle, which are in parallel with the base plate, are ground or finely machined in another manner, in order to provide significant flatness. Preferably, the upper, exposed regions of the second and/or third wall are also ground or finely machined, in order to exhibit significant flatness. As a result, an accuracy of the measurement by means of the measurement body can be significantly improved.

Further preferably, the regions in which the first and/or second and/or third row of holes is formed in the base plate, and/or regions beside the rows of holes, are provided as ground regions.

Further preferably, the measurement body comprises a reinforcement element on an underside of the base plate, in order to improve a stability of the measurement body. The reinforcement element is preferably a slat cross comprising two slats, wherein in each case one slat connects two mutually opposing corners of the base plate at the underside of the base plate. The reinforcement element is preferably also used for clamping the measurement body in the machine tool.

Further preferably, the first, second and third row of holes are arranged in the base plate in such a way that, in the case of a square base plate, a hole for a measuring process is formed at each corner region of the base plate.

The base plate is preferably configured to be square, in particular quadratic. Further preferably, each row of holes in the base plate and the row of step holes, as well as the first and second row of wall holes, each comprises at least one reference hole. The region around each reference hole is preferably ground, such that the ground surface is in each case used as a reference element for determining a Z-coordinate. A center of each reference hole can be used as a reference element for an X- and Y-coordinate.

Further preferably, the holes of the first, second and third row of holes are arranged on a straight line.

The measurement body is preferably produced from Invar. Invar has a very low coefficient of thermal expansion, and is therefore particularly well suited for producing the measurement body. Further preferably, a thickness of the first, second and third wall, and a thickness of the base plate, are identical.

The present invention furthermore relates to a 3-axis machine tool comprising a tool spindle, a measuring device, in particular a 3D measuring sensor, which can be clamped in the tool spindle, and a control unit for controlling the 3-axis machine tool. Furthermore, the 3-axis machine tool comprises a measurement body according to the invention, wherein the control unit is configured to perform a correction of the geometric data of the 3-axis machine tool based on a target/actual comparison of previously determined geometric target dimensions of the measurement body with geometric actual dimensions of the measurement body determined by the measuring device in the 3-axis machine tool. Thus, the control unit comprises a memory, in which the geometric target dimensions of the measurement body, which were determined in a preceding step in a measuring machine, are stored. In order to determine the geometric actual dimension of the measurement body in the 3-axis machine tool, the control unit preferably starts an NC program for measuring the measurement body, in order to determine the actual values of the measurement body. Thus, a correction of geometric data of the 3-axis machine tool can be made by a comparison the target values and the actual values, as a result of which correction the accuracy during machining of workpieces using the 3-axis machine tool is significantly improved. Accordingly, a compensation of geometry errors of the 3-axis machine tool can be achieved in a simple manner. The target values are preferably stored in a memory.

The present invention furthermore relates to a method for checking and compensating geometric deviations in a 3-axis machine tool, wherein the method comprises the steps of:

- clamping a measuring device, in particular a 3D measuring sensor, in a spindle of the 3-axis machine tool,
- arranging a measurement body according to the invention in a working space of the 3-axis machine tool, in particular by clamping to a reinforcement element,
- approaching a plurality of different positions of the measurement body by means of the measuring device, in order to acquire geometric actual data at the measurement body,
- performing a target/actual comparison between the acquired actual data and previously determined target data of the measurement body in order to determine geometric deviations, in particular linear and rotational and perpendicularity deviations, and
- compensating the geometric deviations of the 3-axis machine tool in a control unit of the 3-axis machine tool, in order to increase a working accuracy of the 3-axis machine tool.

In this case, the method according to the invention can be performed relatively quickly and reliably. In particular, the method according to the invention can also be performed at the customer's location, after delivery of a 3-axis machine tool, in a short time, such that conditions prevailing there, in particular temperature conditions at the customer's location, no longer have any negative influences on the geometrical accuracy of the 3-axis machine tool during operation.

Of course, it is also possible for the method to be performed at the manufacturer of the 3-axis machine tool, in order to possibly optimize production processes at the manufacturer of the 3-axis machine tool.

Preferably, the target values of the measurement body are determined beforehand in a coordinate measuring machine, and the measurement body is then arranged in the working space of the 3-axis machine tool in such a way that a coordinate system of the measurement body corresponds to a coordinate system of the 3-axis machine tool.

Further preferably, when measuring the measurement body in the 3-axis machine tool a temperature of the working space is detected and a correction of the actual data, based on the detected temperature of the working space, is performed. This further improves the accuracy for the compensation of geometric deviations.

The method according to the invention preferably serves for checking, correcting and the long-term assessment of a three-axis machine tool. In this case, the method according to the invention preferably determines twenty-one possible geometric errors:

- in each case a position deviation (translational movement of each axis (three possible errors, because three axes)),
- two straightness deviations per axis (translational movement transversely to the axial direction), i.e. a total of six possible geometric errors, and three rotational deviations: sheering, pitching, rolling in each of the three axes (i.e. nine geometric deviations), three perpendicularity deviations of the linear axes X, Y, Z relative to one another (X-Y perpendicularity deviation, X-Z perpendicularity deviation, Y-Z perpendicularity deviation).

It is noted that, depending on the design and kinematics of the three-axis machine tool, individual errors can be disregarded. Preferably, a pitch error of the Y-axis is corrected by the Y-positioning error, the straightness error of the Y-axis in the X-direction, and the perpendicularity error between the Y-axis and the X-axis. In this case, the prerequisite is for an X-spacing of the spindle from the table of the machine tool to be constant. Further preferably, a roll error of the Z-axis is disregarded since the tool rotates in this axis. If, further preferably, a tool length is constant, a pitch error of the Z-axis and a sheer error of the Z-axis can be disregarded. Both errors can be corrected by the straightness error and the perpendicularity error of the Z-axis. Thus, measuring complexity can be reduced by this measure.

Figure 2:
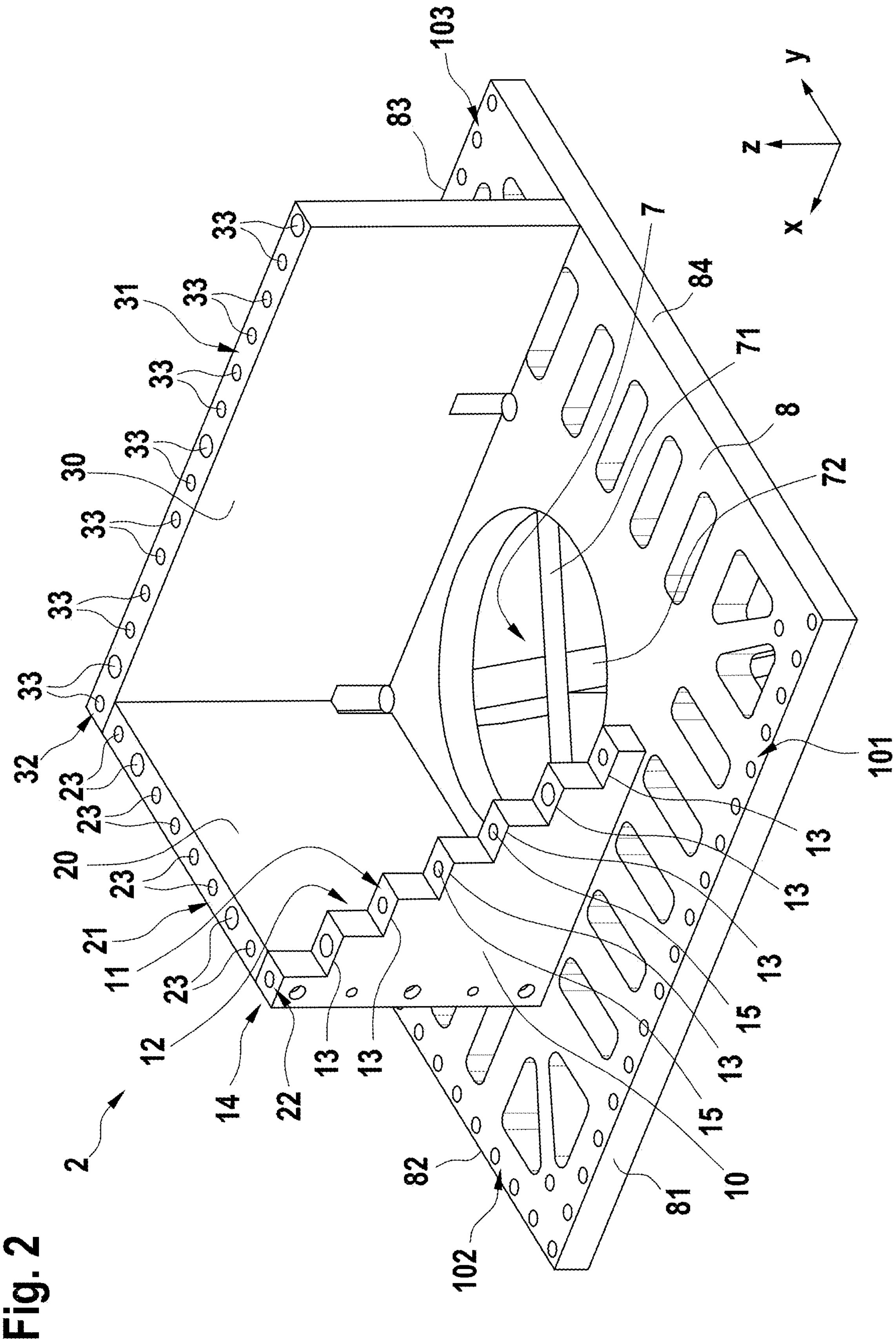
Figure 3:
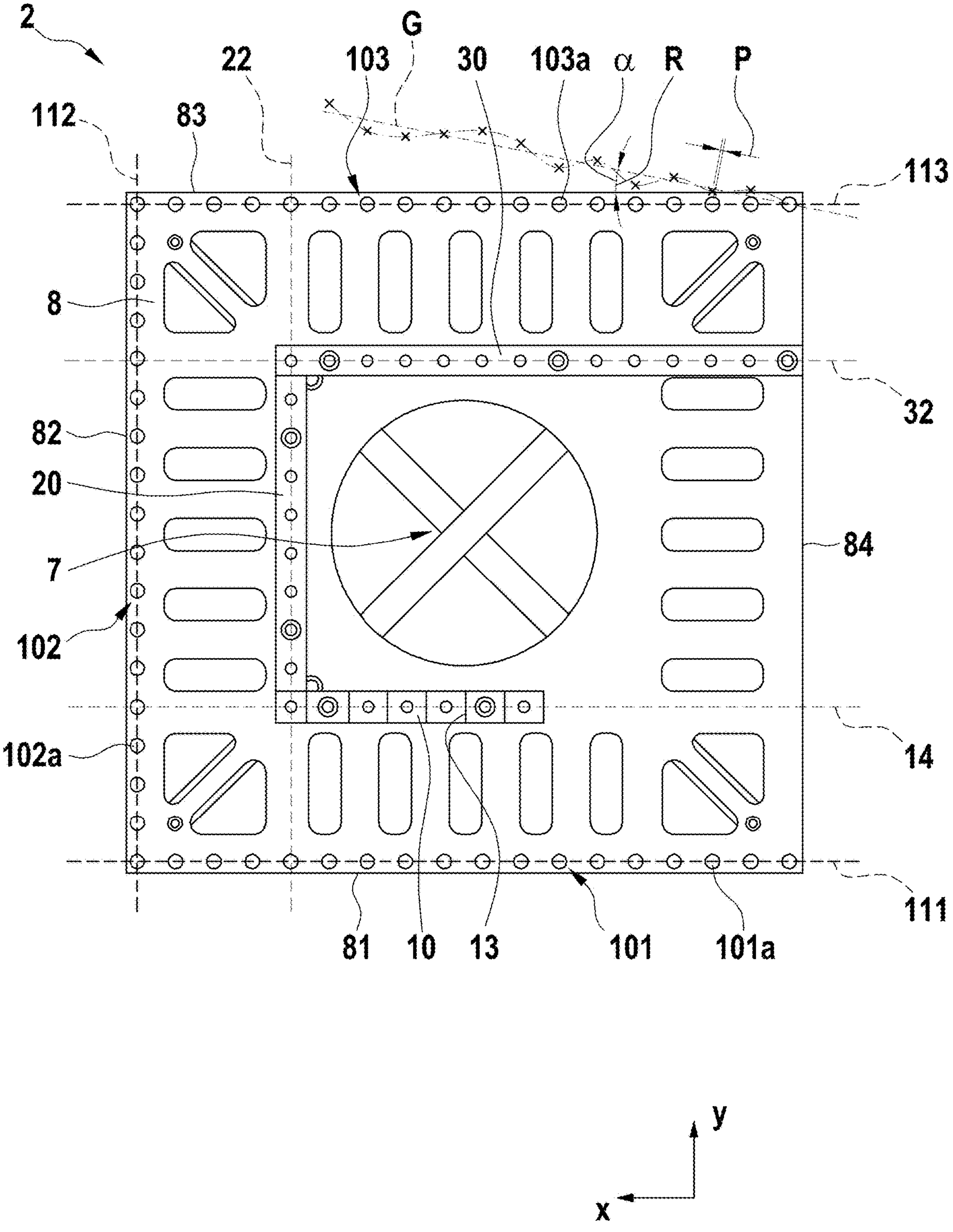
Figure 4:
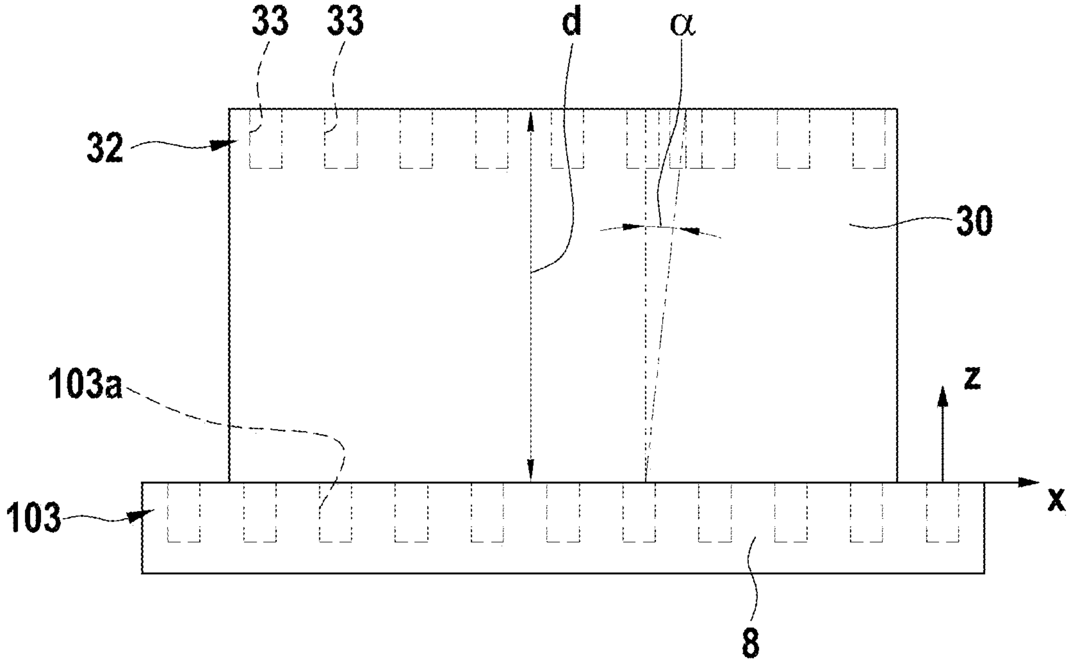
Figure 5:
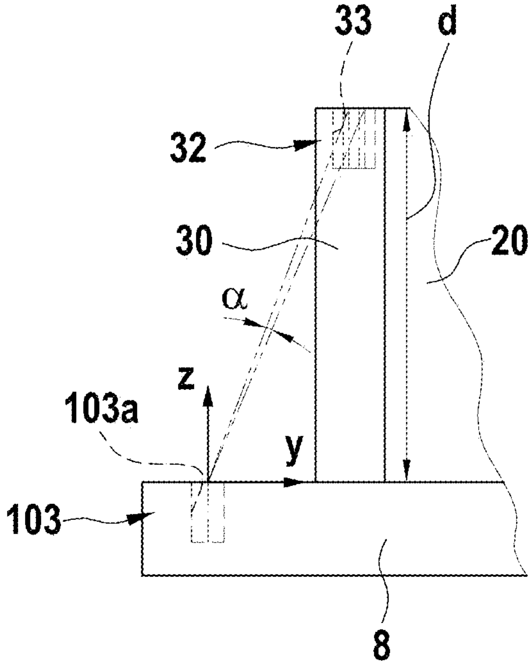
Figure 6:
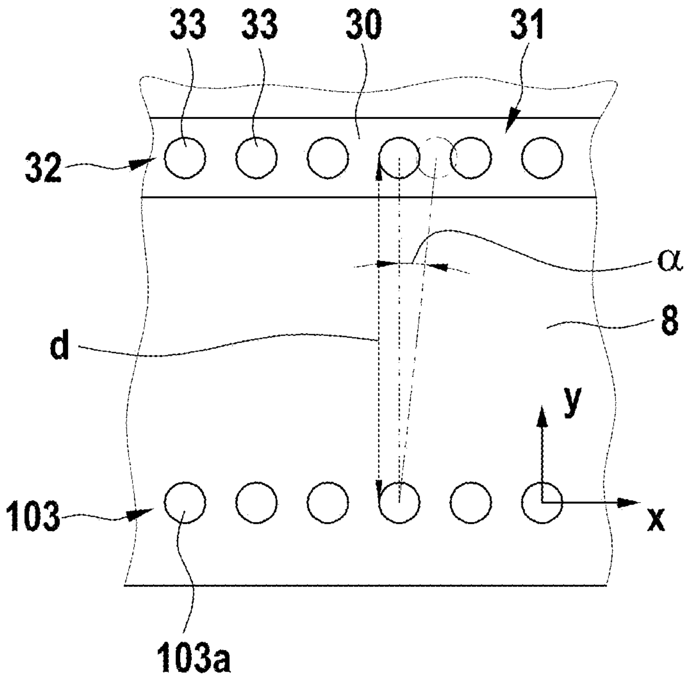

A preferred embodiment of the invention is described in the following, with reference to the accompanying drawings, in which:

FIG. 1 is a schematic, perspective view of a measurement body in a 3-axis machine tool according to a preferred embodiment of the invention, FIG. 2 is a schematic, perspective view of the measurement body from FIG. 1, from a different perspective, FIG. 3 is a schematic plan view of the measurement body from FIG. 2, FIG. 4 is a schematic side view of the measurement body, which shows the determination, by way of example, of a pitch error of the X-axis, FIG. 5 is a partial side view of the measurement body, which shows a determination, by way of example, of a roll error of the X-axis, and FIG. 6 is a schematic illustration for determining a sheer error of the X-axis.

In the following, a 3-axis machine tool 1 and a measurement body 2 for checking geometric deviations of the 3-axis machine tool are described in detail with reference to FIGS. 1 to 6.

Furthermore, a method for checking and compensating geometric deviations of a 3-axis machine tool are described with reference to FIGS. 1 to 6.

As can be seen from FIGS. 1 to 5, the 3-axis machine tool 1 comprises a working space 3, a spindle 4 and a control unit 9.

As can be seen from FIG. 1, a measurement body 2 is arranged on a machine table 6 of the 3-axis machine tool 1.

The measurement body 2 is visible in detail from FIGS. 1, 2 and 3. The measurement body 2 is configured for checking geometric deviations of the 3-axis machine tool, wherein it is possible to determine all linear, rotational and perpendicularity errors, in total twenty-one errors, in a clamping of the measurement body. In particular, coordinates for positioning a tool of the 3-axis machine tool 1 can be determined very precisely by means of the measurement body 2.

The measurement body 2 comprises a planar base plate 8, which spans a base plane in an X-direction and a Y-direction. The measurement body 2 further comprises a first wall 10, a second wall 20 and a third wall 30. The first wall 10, the second wall 20 and the third wall 30 are arranged on the base plate 8 and protrude perpendicularly from the base plate 8 and form a U-shape.

As shown in FIG. 2, a Z-direction is perpendicular to the X-direction and perpendicular to the Y-direction.

As can be seen from FIG. 2, in this case the first wall 10 and the second wall 20 and the third wall 30 are arranged on the base surface of the base plate 8.

The base plate 8 is configured to be square and comprises a first edge 81, a second edge 82, a third edge 83 and a fourth edge 84.

The three walls 10, 20, 30 are, as can be seen in particular from FIGS. 1 and 2, configured differently in terms of geometry. In this case, the first wall 10 is a stepped triangle comprising an upper, exposed region 11 on which a step-shaped region 12 is formed. The step-shaped region 12 comprises a plurality of steps 13.

A hole 15 is formed in each step 13. The holes 15 form a row of step holes 14. In this embodiment, in this case the stepped triangle, configured as the first wall 10, comprises seven steps.

The second wall 20 is a rectangular wall, also having an upper, exposed region 21. A first row of wall holes 22 having a plurality of holes 23 is formed in the upper, exposed region 21.

The third wall 30 is also a rectangular wall and also has an upper, exposed region 31. A second row of wall holes 32 having a plurality of holes 33 is formed in the upper, exposed region 31.

As can be seen in particular from FIG. 2, a size of the second wall 20 is smaller than a size of the third wall 30.

The holes 23 of the second wall 20 lie in a straight line. The holes 33 of the third wall 30 also lie in a straight line. In this case, the holes of the second and third wall are arranged such that the straight lines formed by the holes 23 and 33 intersect at right angles.

As can be seen in particular from FIG. 2, the first wall 10 is arranged at right angles with respect to the second wall 20. The second wall 20 is also arranged at right angles with respect to the third wall 30. As a result, the first wall 10 and the second wall 20 are in parallel with one another.

Furthermore, the first, second and third walls 10, 20 and 30 are arranged at a spacing from the respective edges 81, 82, 83 of the base plate 8, along their long sides. Only an end region of the third wall 30 extends as far as the fourth edge 84 (see FIG. 2).

For the purpose of weight reduction, the base plate 8 has a larger central opening and a plurality of longitudinal openings (without reference numerals).

A reinforcement element 7 is arranged on the underside of the base plate 8, which element comprises a first slat 71 and a second slat 72. The two slats 71, 72 are arranged in a cross shape and reinforce the base plate 8 and thus the measurement body 2. The reinforcement element 7 furthermore makes it possible for the measurement body 2 to be clamped in a simple manner on the machine table 6. This in particular prevents undesired stresses being introduced into the base plate or the three walls 10, 20, 30 by the clamping process, which stresses could lead to falsification of the measurement result.

Furthermore, the measurement body 2 comprises a first row of holes 101, a second row of holes 102 and a third row of holes 103 in the base plate, on the upper side. The first row of holes 101 comprises a plurality of holes 101*a*, which are arranged on a first straight line 111. The first straight line 111 extends in parallel with the first edge 81. The second row of holes 102 comprises a plurality of holes 102*a*, which are arranged on a second straight line 112. In this case, the second row of holes 102 is in parallel with the second edge 82. The third row of holes 103 comprises a plurality of holes 103*a*, which are arranged on a third straight line 113. The third row of holes 103 is in parallel with the third edge 83 (cf. FIG. 3). For improved clarity, in FIG. 3 not all the holes of the first, second and third row of holes are provided with a reference numeral.

As is furthermore visible from FIG. 3, the first row of holes 101 is in parallel with the row of step holes 14. The second row of holes 102 is in parallel with the first row of wall holes 22 of the second wall 20. The third row of holes 103 is in parallel with the second row of wall holes 32.

The number of holes of the first, second and third row of holes is preferably the same as is the geometric size, in particular the hole spacing.

It is noted that strip-shaped, ground reference surfaces (not shown in FIG. 3) can be provided for example in parallel beside the three rows of holes.

Furthermore, the first, second and third row of holes 101, 102, 103 are provided such that a hole is provided in each corner of the base plate 8.

Further preferably, a thickness of the base plate 8 is also the same as the wall thicknesses of the walls 10, 20, 30.

The measurement body 2 is arranged on the machine table 6 of the 3-axis machine tool 1. Furthermore, a 3D measuring sensor, by means of which a determination of actual coordinates of the 3-axis machine tool by the measurement body 2 is performed, is arranged in the spindle 4.

The 3-axis machine tool 1 further comprises the control unit 9, which is configured for controlling the 3-axis machine tool. The control unit 9 is further configured, based on a target/actual comparison of the geometric dimensions of the measurement body 2, to perform a correction of the geometric data of the 3-axis machine tool 1.

The 3-axis machine tool comprises, as already explained above, three linear axes, specifically a first axis in the X-direction, a second axis in the Y-direction, and a third axis in the Z-direction.

Overall, the three linear axes result in twenty-one deviations, wherein three thereof are perpendicularity deviations of the linear axes relative to one another. Thus, a total of twenty-one error parameters result for the 3-axis machine tool.

Thus, by means of the method according to the invention, checking and correction of all straightness deviations, rotation deviations and perpendicularity deviations of the 3-axis machine tool can be performed.

For this purpose, the measurement body 2 must first be measured by means of a coordinate measuring machine (not shown), in order to generate target values. Said target values are then supplied to the control unit 9 of the 3-axis machine tool 1 and stored in a memory. In this case, in order to measure the measurement body 2, a coordinate system is spanned such that an X-Y plane is in parallel with the base plate 8. Thus, on the basis of Z-positions, X-positions and Y-positions, determined multiple times, of different reference elements of the measurement body 2, the geometry of the measurement body 2, which is preferably produced from Invar, is determined. At the same time, a zero point of the coordinate system of the measurement body 2 is also specified. For example, the ground step surfaces or the ground reference surfaces serve as reference elements for the Z-positions. The holes of the rows of holes 101, 102, 103 and the holes 15 in the steps 13 and the holes 23, 33 in the exposed regions 11, 21 serve as reference elements for the X-positions and Y-positions.

In order to now detect the geometric deviations of the 3-axis machine tool, the measurement body 2 is introduced, on the machine table 6, into the working space 3 of the 3-axis machine tool. In this case, the measurement body 2 can be clamped or fastened on a machine table in another manner. In this case, the X-Y-Z coordinate system of the measurement body should in principle be oriented in parallel with the X-Y-Z coordinate system of the 3-axis machine tool. The measurement of the measurement body 2 in the 3-axis machine tool 1 is then performed by means of the 3D measuring device 5, e.g. in a 3D measuring sensor. Typically, modern 3-axis machine tools comprise a 3D measuring sensor of this kind, for example for detecting component positions and component geometries.

Thus, before the measurement the coordinate system of the 3-axis machine tool is oriented identically to the coordinate system of the coordinate measuring machine in which the measurement body 2 was previously measured.

After the measurement body 2 is fixed in the working space 3 of the 3-axis machine tool, the control unit 9 can preferably allow a fully automatically executed NC program to be executed, in order to measure the measurement body 2 by means of the 3D measuring sensor 5 and thereby to determine the actual values of the 3-axis machine tool 1.

Preferably, during the measurement of the measurement body 2 in the working space of the 3-axis machine tool 1, the temperature of the working space 3 of the 3-axis machine tool 1 is also detected and stored. Should this temperature of the working space differ from a reference temperature, e.g. 20° C., a coefficient of thermal expansion of the workpieces to be machined on the 3-axis machine tool must be taken into account during the workpiece machining. Here, a corresponding correction of the actual values of the 3-axis machine tool must then be performed.

After completion of the measurement of the measurement body 2 in the 3-axis machine tool 1, and optionally a thermal adjustment of the actual values, the actual values of the 3-axis machine tool are determined and can be compared with the target values of the measurement body. Thus, the geometric deviations of the 3-axis machine tool in the form of position deviations, straightness deviations and perpendicularity deviations can be calculated, and thus checked and corrected, by the comparison of the target and actual values. In this case, FIG. 3 shows, by way of example, in a plan view of the measurement body 2, straightness deviations G, a perpendicularity deviation R (angle $\alpha$), and position deviations P.

For example, first a position deviation of the X-axis can be determined, in that the differences of actual positions and target positions in the X-direction of the measured reference elements on the base plate 8 along the X-axis are evaluated. Since the zero point of the measurement body 2 and the position of the reference elements relative to the zero point are known, the determined differences can be associated with X-axis positions of the 3-axis machine tool. Thus, a table of X-axis positions of the 3-axis machine tool and positions deviations in the X-direction at these X-axis positions results. In this case, these position deviations can be stored and used directly, in the control unit 9, as correction data or an error compensation of the 3-axis machine tool.

Alternatively, the deviations could also be pre-processed mathematically. The deviations can for example also be approximated with different mathematical functions. Precisely in the case of small measurement bodies 2 having few reference elements, for example an approximation of the differences with a straight line (line of best fit) is conceivable. In this case, only a scaling error is corrected.

Since the measurement body 2 covers only a part of the working space 3 of the 3-axis machine tool, the detected actual values are preferably extrapolated by means of a corresponding mathematical function. As a result, deviations for the entire working space 3 of the 3-axis machine tool 1 are obtained.

Straightness deviations G of the X-axis are determined in the same way. In this case, the position deviations P in the Y-direction or Z-direction are associated with the X-axis positions. In this case, the differences between actual position and target positions in the Y-direction result from the determined centers of the holes of the three rows of holes 101, 102, 103 and the reference holes on the first, second and third walls 10, 20, 30. The differences between actual positions and target positions in the Z-direction result e.g. from the reference surfaces on the base plate 8 and the ground surfaces of the steps 13. In this case, too, a mathematical pre-processing or approximation is possible.

When the correction data for the position deviation and straightness deviation of the X-axis have been calculated, all the measurement data of the actual positions of the reference elements are adjusted, for the further evaluation, on the basis of the correction data for the position deviation of the X-axis, the straightness deviation of the X-axis in the Y-direction, and the straightness deviation of the X-axis in the Z-direction. It is preferably assumed at this point that the adjusted actual position no longer has any errors in the X-direction. As a result, in the further evaluation the errors in the X-direction can be disregarded.

In a next step, a perpendicularity error R between the X-axis and the Y-axis can be calculated. For this purpose, two lines of best fit are calculated. The first line of best fit results from the X-axis position of the reference elements on the base plate 8 along the X-direction and the position deviations thereof in the Y-direction. The second line of best fit results from the Y-axis positions of the reference elements on the base plate 8 along the Y-direction and the position deviations thereof in the X-direction. Subsequently, an angle α between the two lines of best fit is calculated (cf. FIG. 3). In this case, the determined deviation can be used directly as a correction value for error compensation in the control unit 9.

Subsequently, the actual positions of all the reference elements in the measurement data are adjusted according to their Y-position, on the basis of the perpendicularity error, such that the measurement data no longer contain any X-Y perpendicularity errors.

Subsequently, the position deviations and the straightness deviations of the Y-axis are calculated in the same way as in the case of the X-axis. For this purpose, the differences in the actual and target position of the reference positions on the base plate 8 along the Y-axis are evaluated (cf. FIG. 3). Together with the zero point, a table with Y-axis positions of the 3-axis machine tool and the positions deviations in the X, Y and Z-directions at these Y-axis positions results. As in the case of the X-axis, the data can be further processed or used directly as correction data for error compensation of the 3-axis machine tool, in the control unit 9. Here, too, the correction data should be extrapolated with a corresponding mathematical function in order to define the entire working space 3.

Subsequently, all the actual positions of the reference elements are adjusted, for the further evaluation, on the basis of the correction data for the position deviation and the two straightness deviations of the Y-axis. It is preferably assumed at this point that the adjusted actual position no longer has any errors in the Y-direction. As a result, in the further evaluation the errors in the Y-direction can be disregarded. FIGS. 4, 5 and 6 show, by way of example, the determination of pitch error in the X-axis (FIG. 4) and the determination of a roll error of the X-axis (FIG. 5), as well as the determination of a sheer error of the X-axis (FIG. 6).

In order to be able to determine a sheer error of the X-axis (FIG. 6), geometric features must be present in the X-direction, the X-position of which can be detected using the measuring sensor. In order that the error can be determined independently of other errors, the Y- and Z-positions of the features must be identical. In order to be able to measure the influence of the X-sheer error, furthermore a measurement must be made at a different Y-position from the case of the first X-feature series. Furthermore, the Y-spacing d from the first X-feature series must be known (cf. FIG. 6).

In a next step, the pitch error of the X-axis is calculated. For determining the pitch error of the X-axis (FIG. 4), geometric features must be present in the X-direction, the X-position of which can be detected using the measuring sensor. In order that the error can be determined independently of other errors, the Y- and Z-position of the features must be identical. In order to be able to measure the influence of the X-pitch error, furthermore a measurement must be made at a different Z-position from the case of the first X-feature series. Furthermore, the Z-spacing d from the first X-feature series must be known.

For determining a roll error of the X-axis (FIG. 5), geometric features must be present in the X-direction, the Y-position of which can be detected using the measuring sensor. In order that the error can be determined independently of other errors, the Y- and Z-positions of the features must be identical. In order to be able to measure the influence of the X-roll error, furthermore a measurement must be made at a different Z-position from the first X-feature series. Furthermore, the Z-spacing d from the first X-feature series must be known (cf. FIG. 5).

A determination of the roll error and the sheer error of the Y-axis takes place according to the measurement described in FIG. 4 and FIG. 5.

In a next step, the perpendicularities between the X-axis and the Z-axis are calculated. For this purpose, two lines of best fit are calculated. The first line of best fit results from the X-axis positions of the reference elements on the base plate 8 along the X-direction and the position deviations thereof in the Z-direction. The second line of best fit results from the Z-axis position of the reference elements on the first wall 10 (stepped triangle) in the X-direction and the position deviations thereof in the X-direction. Subsequently, the angle α between the two lines of best fit is calculated. The determined deviation can be used directly as a correction value for error compensation in the control unit 9.

The perpendicularity between the Y-axis and the Z-axis is calculated in the same way. In this case, the first line of best fit results from the Y-axis positions of the reference elements on the base plate 8 along the Y-direction and the position deviations thereof in the Z-direction. The second line of best fit results from the Z-axis positions of the reference elements on the second wall 20 in the Y-direction and the position deviations thereof in the Y-direction. The deviations of the perpendicularity between these two straight lines can again be used directly as a correction value for error compensation.

The actual position of all the reference elements is then adjusted, in the measurement data, according to their Z-position, on the basis of the perpendicularity error, such that the measurement data no longer contain any X-Z-perpendicularity errors or any Y-Z-perpendicularity errors.

In a further step, the geometric deviations of the Z-axis are calculated. For this purpose, the reference elements (reference holes and ground stepped surfaces) of the three walls 10, 20, 30 are used. Since the errors of the X-axis and Y-axis, and the three perpendicularity errors, have already been eliminated from the measurement data in the preceding evaluation, it is assumed in this step that a displacement in the X-direction or Y-direction, which is necessary for measuring the steps, does not influence the geometric deviations of the Z-axis.

Thus, the position deviation of the Z-axis is determined in that the differences of the actual position and target position of the reference position in the Z-direction, on the first wall 10, are evaluated. Since the zero point of the measurement body 2 and the position of the reference elements relative to the zero point are known, the determined differences can be associated with Z-axis positions of the 3-axis machine tool. Thus, a table of Z-axis positions results, which positions can thus be used directly as correction data or an error compensation of the 3-axis machine tool. As in the case of the X-axis and the Y-axis, the data can be further processed or used directly as correction data. Here, too, the correction data can be extrapolated with a corresponding mathematical function.

As in the case of the other axes, the straightness deviations of the Z-axis are determined in the same way. In this case, the position deviations in the Y-direction or X-direction are associated with the Z-axis positions. In this case, the differences between the actual position and target position result from the determined centers of the holes. The further processing of the straightness deviations can take place identically to the position deviations of the Z-axis.

In this way, all relevant geometric errors, including sheering, pitching and rolling, can be checked and corrected with the aid of the measurement body 2. The method is suitable in particular for the correction of a 3-axis machine tool geometry after a change in the thermal conditions, since in this case in general linear errors occur, which can be easily extrapolated. In addition, this method can also be used for adjusting the geometry of the 3-axis machine tool to materials having different coefficients of thermal expansion if a temperature different from the reference temperature prevails in the working space.

In addition to the above written description of the invention, for the additional disclosure thereof reference is hereby explicitly made to the illustration of the invention in FIGS. 1 to 6.

LIST OF REFERENCE NUMERALS

1 3-axis machine tool
2 measurement body
3 working space
4 spindle
5 measuring device (3D measuring sensor)
6 machine table
7 reinforcement element
8 base plate
9 control unit
10 first wall
11 upper, exposed region
12 step-shaped region
13 steps
14 row of step holes
15 hole
20 second wall
21 upper, exposed region
22 first row of wall holes
23 holes
30 third wall
31 upper, exposed region
32 second row of wall holes
33 holes
71 first slat
72 second slat
81 first edge
82 second edge
83 third edge
84 fourth edge
101 first row of holes
101*a* holes
102 second row of holes
102*a* holes
103 third row of holes
103*a* holes
111 first straight line
112 second straight line
113 third straight line
d spacing
G straightness deviation
R perpendicularity error
P position deviation
X X-axis
Y Y-axis
Z Z-axis
α perpendicularity deviation

The invention claimed is:

1. A measurement body for checking geometric deviations in a 3-axis machine tool (1), comprising:

a base plate (8), a first wall (10) which is arranged on the base plate (8) and protrudes perpendicularly from the base plate (8), and a second wall (20) which is arranged on the base plate (8) and protrudes perpendicularly from the base plate (8) and is arranged perpendicularly to the first wall (10), wherein a first row of holes (101) and a second row of holes (102) are formed in the base plate (8), wherein the first wall (10) is a stepped triangle and comprises a step-shaped region (12) having a plurality of steps (13), on an upper, exposed region (11), wherein the second wall (20) is a square wall and comprises a first row of wall holes (22) on an upper, exposed region (21) which extends in parallel with the base plate (8), and wherein the first row of holes (101) is arranged in parallel with a row of step holes (14) and the second row of holes (102) is arranged in parallel with the first row of wall holes (22).

2. The measurement body according to claim 1, wherein the step-shaped region (12) comprises a first row of step holes (14), wherein in particular a hole (15) and a ground reference surface is formed in each step (13).

3. The measurement body according to claim 1, further comprising a third wall (30) which is arranged on the base plate (8) and protrudes perpendicularly from the base plate (8), wherein the third wall (30) is arranged perpendicularly to the second wall (20), and wherein the second wall (20) comprises a second row of wall holes (32) comprising holes (33) on an upper, exposed region (31).

4. The measurement body according to claim 3, wherein the first wall (10), the second wall (20) and the third wall (30) are arranged in a U-shape on the base plate.

5. The measurement body according to claim 4, wherein the first wall (10), the second wall (20) and the third wall (30) are arranged on the base plate (8) at a spacing from a first edge (81), from a second edge (82) and from a third edge (83), wherein the spacing is greater than or equal to twice diameters of the holes of the first, second and third row of holes.

6. The measurement body according to claim 3, further comprising a third row of holes (103) in the base plate (8) which extends in parallel with the second row of wall holes (32).

7. The measurement body according to claim 6, wherein the first row of holes (101), the second row of holes (102) and the third row of holes (103) each extend along an edge of the base plate (8), such that a hole of a row of holes is arranged at each corner of the base plate (8).

8. The measurement body according to claim 1, wherein in addition to the holes in the steps (13) ground surfaces are present, and/or in addition to the holes of the first and/or second and/or third row of holes (101, 102, 103) ground surfaces are formed.

9. The measurement body according to claim 1, further comprising a reinforcement element (7) which is arranged under the base plate (8) for mechanically reinforcing the base plate (8) and/or on the machine tool as a clamping aid.

10. A 3-axis machine tool, comprising a tool spindle (4), a measurement body (2) according to claim 1, a measuring device (5) which is clamped in the tool spindle (4) and is configured to detect actual values of the measurement body (2) fixed in the 3-axis machine tool (1), and a control unit (9), configured for controlling the 3-axis machine tool (1), wherein the control unit (9) is further configured to perform a target/actual comparison based on geometric target values of dimensions of the measurement body (2) and the actual values of the measurement body (2) fixed in the 3-axis machine tool (1), determined for the 3-axis machine tool (1) by means of the measuring device (5), and, in the event of occurrence of deviations between the target values and the actual values, to perform a correction of geometric data of the 3-axis machine tool (1) in a control program of the control unit (9).

11. The 3-axis machine tool according to claim 10, wherein the control unit (9) comprises a memory, in which the target values of the measurement body (2) are stored.

12. A method for checking and compensating geometric deviations in a 3-axis machine tool, comprising steps of:

clamping a measuring device (5) in a tool spindle (4) of the 3-axis machine tool, arranging a measurement body (2) according to claim 1 in a working space (3) of the 3-axis machine tool, approaching a plurality of positions of the measurement body (2) in order to acquire geometric actual data of the 3-axis machine tool by means of the measurement body (2), performing a target/actual comparison of the geometric actual data with the stored target data of the measurement body (2) in order to determine geometric deviations, and compensating the geometric deviations in a control unit (9) of the 3-axis machine tool.

* * * * *